United States Patent
Jarrier

(10) Patent No.: US 8,852,308 B2
(45) Date of Patent: Oct. 7, 2014

(54) REVERSE V-CELL OR MINIPLEAT FILTER WITH PLEAT PACK MECHANICALLY SEALED

(71) Applicant: BHA Altair, LLC, Franklin, TN (US)

(72) Inventor: Etienne René Pascal Jarrier, Basingstoke (GB)

(73) Assignee: BHA Altair, LLC, Franklin, TN (US)

( * ) Notice: Subject to any disclaimer, the term of this patent is extended or adjusted under 35 U.S.C. 154(b) by 148 days.

(21) Appl. No.: 13/680,302

(22) Filed: Nov. 19, 2012

(65) Prior Publication Data

US 2014/0137524 A1    May 22, 2014

(51) Int. Cl.
*B01D 46/00*    (2006.01)
*B01D 46/12*    (2006.01)

(52) U.S. Cl.
CPC .......... *B01D 46/0015* (2013.01); *B01D 46/002* (2013.01); *B01D 2265/028* (2013.01); *B01D 46/125* (2013.01); *B01D 46/0005* (2013.01); *Y10S 55/31* (2013.01)
USPC ............... 55/484; 55/483; 55/497; 55/521; 55/DIG. 31

(58) Field of Classification Search
CPC .......... B01D 46/0005; B01D 46/0015; B01D 46/002; B01D 46/12; B01D 46/125; B01D 46/521; B01D 2265/02; B01D 2265/028; B01D 2267/30; B01D 2267/70
USPC ............. 55/482, 483, 484, 497, 521, DIG. 31
See application file for complete search history.

(56) References Cited

U.S. PATENT DOCUMENTS

| | | | |
|---|---|---|---|
| 2,966,959 A * | 1/1961 | Neumann | 55/484 |
| 5,743,927 A | 4/1998 | Osendorf | |
| 6,485,538 B1 * | 11/2002 | Toyoshima | 55/490 |
| 6,913,059 B2 * | 7/2005 | Nixdorf | 156/474 |
| 6,955,696 B1 * | 10/2005 | Ost et al. | 55/357 |
| 7,931,726 B2 * | 4/2011 | Karlsson et al. | 55/521 |
| 8,328,895 B2 * | 12/2012 | Nicholas | 55/483 |
| 8,425,644 B2 * | 4/2013 | Sundvik et al. | 55/484 |
| 2004/0089982 A1 | 5/2004 | Witthoft | |
| 2004/0141835 A1 | 7/2004 | Katayama et al. | |
| 2009/0193773 A1 | 8/2009 | Sundvik et al. | |
| 2013/0291497 A1 * | 11/2013 | Sundvik et al. | 55/357 |

FOREIGN PATENT DOCUMENTS

| | | |
|---|---|---|
| JP | 2007-046587 | 2/2007 |
| WO | 02/070108 A1 | 9/2002 |
| WO | 2005/074468 A2 | 8/2005 |

* cited by examiner

*Primary Examiner* — Robert Clemente
(74) *Attorney, Agent, or Firm* — Reinhart Boerner Van Deuren P.C.

(57) ABSTRACT

A filter arrangement for a system within which fluid is filtered and an associated method of providing the arrangement. A frame of the arrangement includes an outer periphery shape that is complementary to a shape for location of the filter arrangement therein and a plurality of filter pleat pack locations. At each filter pleat pack location the frame includes at least one portion having a saw-tooth contoured surface. A plurality of filter pleat packs each includes a plurality of pleats. Each filter pleat pack is removably located at a respective filter pleat pack location of the frame, with the pleats of the filter pleat pack mating against the saw-tooth contoured surface. A plurality of removable retainers that non-permanently hold the filter pleat packs. Each retainer has at least one saw-tooth contoured surface that mates against the pleats so that the pleats of the filter pleat pack are sandwiched.

16 Claims, 5 Drawing Sheets

REVERSE V-CELL OR MINIPLEAT FILTER WITH PLEAT PACK MECHANICALLY SEALED

BACKGROUND OF THE INVENTION

1. Field of the Invention

The invention relates to filter arrangements that utilize pleated filter media.

2. Discussion of Prior Art

Filtration of fluid, such as air, is typical for various applications such as gas turbine inlet systems. Various types of filter arrangements can be provided to accomplish the filtration. One type of filter arrangement is known as a V-Cell filter arrangement. The V-Cell filter arrangement consists of a plurality of pleated filter media segments fixed and sealed (e.g., glued, epoxied, or similar) within a frame. These pleated filter media segments can be referred to as filter pleat packs or panels. The filter panels are arranged in pairs so that each pair provides a general V-shape. There any number of panel pairs. All of the panel pairs are fixed within the frame to retain the V-shape. The open or wide end of each V-shape is typically located at an upstream side of the arrangement. At the open end, the two filter panels of the respective V-shape are spaced from each other to allow fluid flow into the space of the V-shape and thus allow fluid to move to the filter panels for filtration by the filter panels.

As mentioned there may be any number of pairs of filter panels. If there are plural filter panel pairs, each pair is associated with just a portion of the overall face size of the V-Cell filter arrangement. As such, the V-cell filter arrangement provides a greater amount of filter media surface area as compared to a single panel filter that has a face size equal to the face size of the filter arrangement. The greater amount of media surface allows for lower pressure drops (e.g., lower flow resistance), longer service life, and/or high efficiency.

As can be appreciated, the filter media provides the actual function of filtering particulate from the fluid flow. Specifically, particulate is trapped or blocked by the filter media. As can be appreciated, the filter media has a finite life due to accumulation of particulate, accumulation that causes reduced through-flow ability, or the like. As mentioned, within the V-Cell filter arrangement the filter media is fixed and sealed (e.g., glued, epoxied, or similar) within the frame. Thus, although a V-Cell filter arrangement has many benefits, when replacement of the V-Cell filter arrangement becomes necessary (e.g., after desired filter media life is reached), the V-Cell filter arrangement is a substantial object to discard. To be clear, the entire V-Cell filter arrangement is discarded when the filter media has reached its end of life. As such there is a need to further improvement concerning V-Cell filter arrangement technology.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

In accordance with one aspect, the present invention provides a filter arrangement for a system within which fluid is filtered. The system has a portion with an aperture into which the filter arrangement is located for filtering fluid from a dirty side and to a clean side as the fluid flows through the filter arrangement. The filter arrangement includes a frame with an outer periphery that has a shape that is complementary to a shape of the system aperture for location of the filter arrangement therein. The frame also has a plurality of filter pleat pack locations. Each filter pleat pack location is associated with an aperture through the frame for flow proceeding from the dirty side to the clean side. At each filter pleat pack location adjacent to each frame aperture the frame includes at least one portion having a saw-tooth contoured surface. The filter arrangement includes a plurality of filter pleat packs that each allows flow therethrough while stopping flow of particulate matter. Each filter pleat pack includes a plurality of pleats. Each filter pleat pack is removably located at a respective filter pleat pack location of the frame, covering a respective frame aperture, with the pleats of the filter pleat pack mating against the respective saw-tooth contoured surface. The filter arrangement includes a plurality of removable retainers that non-permanently hold the filter pleat packs against the frame. Each retainer has at least one saw-tooth contoured surface that mates against the pleats of the filter pleat pack so that the pleats of the filter pleat pack are sandwiched between the retainer and the frame.

In accordance with another aspect, the present invention provides a method of providing a filter arrangement for a system within which fluid is filtered. The system has a portion with an aperture into which the filter arrangement is located for filtering fluid from a dirty side and to a clean side as the fluid flows through the filter arrangement. The method includes providing a frame that has an outer periphery that has a shape that is complementary to a shape of the system aperture for location of the filter arrangement therein, and that has a plurality of filter pleat pack locations. Each filter pleat pack location is associated with an aperture through the frame for flow proceeding from the dirty side to the clean side. At each filter pleat pack location adjacent to each frame aperture the frame includes at least one portion having a saw-tooth contoured surface. The method includes providing a plurality of filter pleat packs that each allows flow therethrough while stopping flow of particulate matter. Each filter pleat pack includes a plurality of pleats. Each filter pleat pack is removably located at a respective filter pleat pack location of the frame, covering a respective frame aperture, and with the pleats of the filter pleat pack mating against the respective saw-tooth contoured surface. The method includes providing a plurality of removable retainers that non-permanently hold the filter pleat packs against the frame. Each retainer has at least one saw-tooth contoured surface that mates against the pleats of the filter pleat pack so that the pleats of the filter pleat pack are sandwiched between the retainer and the frame.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
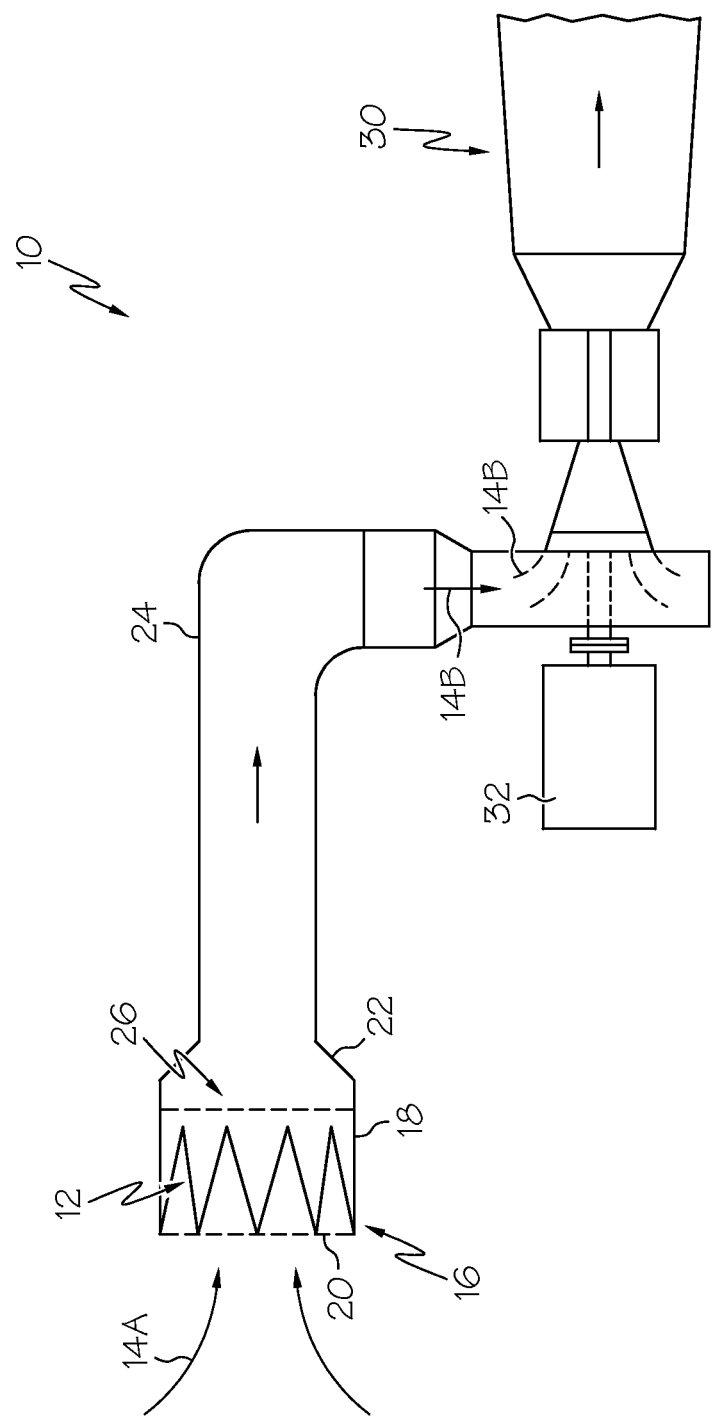
FIG. 1 is a schematic illustration of an example system that includes an example filter arrangement in accordance with an aspect of the present invention.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

FIG. 1 is a schematic illustration of an example system 10 that utilizes filtered fluid (e.g., air) and in which a filter arrangement 12 in accordance with an aspect of the present invention can be utilized. It is to be appreciated that the example system 10 shown within FIG. 1 is just one example. Use of the filter arrangement 12 in accordance with an aspect of the present invention within other systems is contemplated. For example, although the example system utilizes filtered fluid, it is also contemplated that fluid can be filtered for discharge (e.g., to ambient atmosphere), storage, etc. As such, the example system 10 presented within FIG. 1 is not to be construed as a limitation upon the present invention.

Turning to the shown example system 10, the example is a turbine system 10 that utilizes air (see 14A, 14B in FIG. 1) and thus air is the example fluid being filtered fluid. It is to be appreciated that although air is the presented example fluid being filtered, other fluids (e.g., gases, such as combustion gases) are contemplated as fluid that can be filtered using the filter arrangement 12 in accordance with an aspect of the present invention. Hereinafter, although the fluid may be referred to as air, such is not to be construed as a limitation upon the present invention.

The system 10 includes an air intake 16 that has a filter house portion 18. The filter house portion includes an intake 20, which is exposed to ambient atmosphere air 14A, and an outlet 22, which is connected to a fluid passageway 24, which leads downstream toward at least one air consuming component of the system 10. Thus, the filter house portion 18 defines an aperture 26 through which air flows. The filter arrangement 12, in accordance with an aspect of the present invention, is located within the filter house portion 18. Specifically, the filter arrangement 12 is located within the aperture 26. As can be appreciated, since the filter arrangement 12 filters the flow of fluid (e.g., air), the filter arrangement within the aperture 26 of the system 10 thus defines the boundary between a dirty fluid side (e.g., in the example it is the side with ambient air 14A) and a clean fluid side (e.g., with the flowing filtered fluid 14B) and particulate matter is filtered by the filter arrangement.

It is to be appreciated that the filter arrangement 12 is fitted into the aperture 26 such that ambient atmosphere air 14A (e.g., dirty, unfiltered) cannot bypass the filter arrangement. As discussed further below, the filter arrangement 12 has a size/configuration that is to mate with a size/configuration of the aperture 26 to block such bypass and permit flow only through the filter arrangement for filtering there by. It is to be further appreciated that the specifics of the filter arrangement 12 and filter house portion 18, with its aperture 26, need not be as shown within the schematic example of FIG. 1. For example, the filter house portion may include a sheet or barrier in which one or more apertures 26 are provided. One or more respective filter arrangements 12 would be located in the one or more apertures 26 on such a sheet or barrier. Along these lines, the use/presence of plural filter arrangements 12 is certainly contemplated. As such, the filter arrangement 12 and the filter house portion 18 shown within FIG. 1 are to be understood as being very highly schematized and that many details (e.g., size, placement, multiplicity, orientation, etc.) can be varied, and yet the filter arrangement 12 would still be within the scope of the present invention. It is to be appreciated that FIG. 1 is only to show one example system 10 and the flow of fluid associated therewith.

With this understanding, the other portions of the example system 10 can be briefly discussed. The fluid passageway leads to a turbine component 30. The filtered air is thus delivered to the turbine component 30. Within the turbine component 30, the filtered air is combined with a combustible fuel (e.g., natural gas, or the like) to power the turbine. Such operation of the turbine component will be readily appreciated and understood. A load 32, such as an electrical generator, is operatively connected to be driven by the turbine component 30. Again, it is to be understood that these portions of the system 10 are only schematically shown. Also, these portions of the system 10 need not be limitations upon the present invention.

Figure 2:
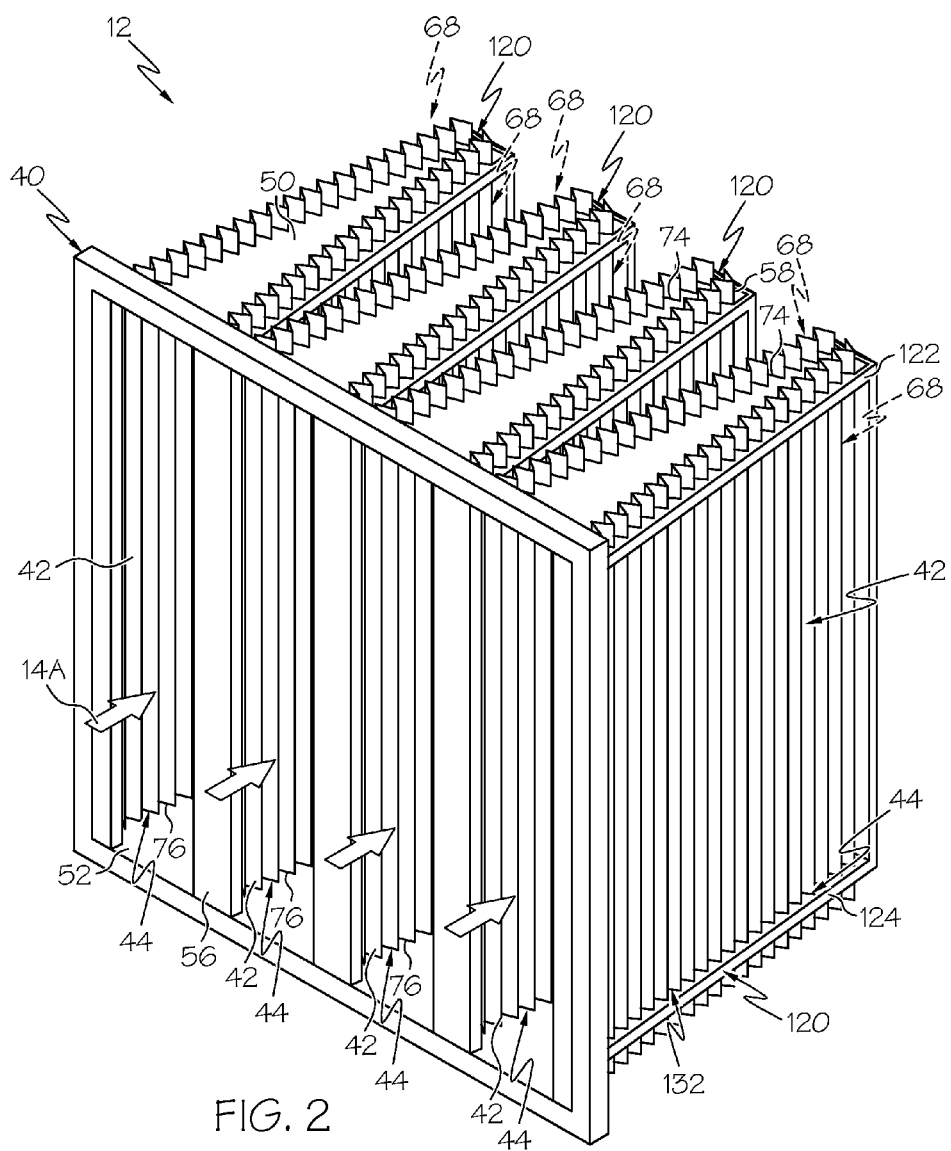
FIG. 2 is a schematized, perspective illustration of one example of the filter arrangement in accordance with an aspect of the present invention.
Figure 3:
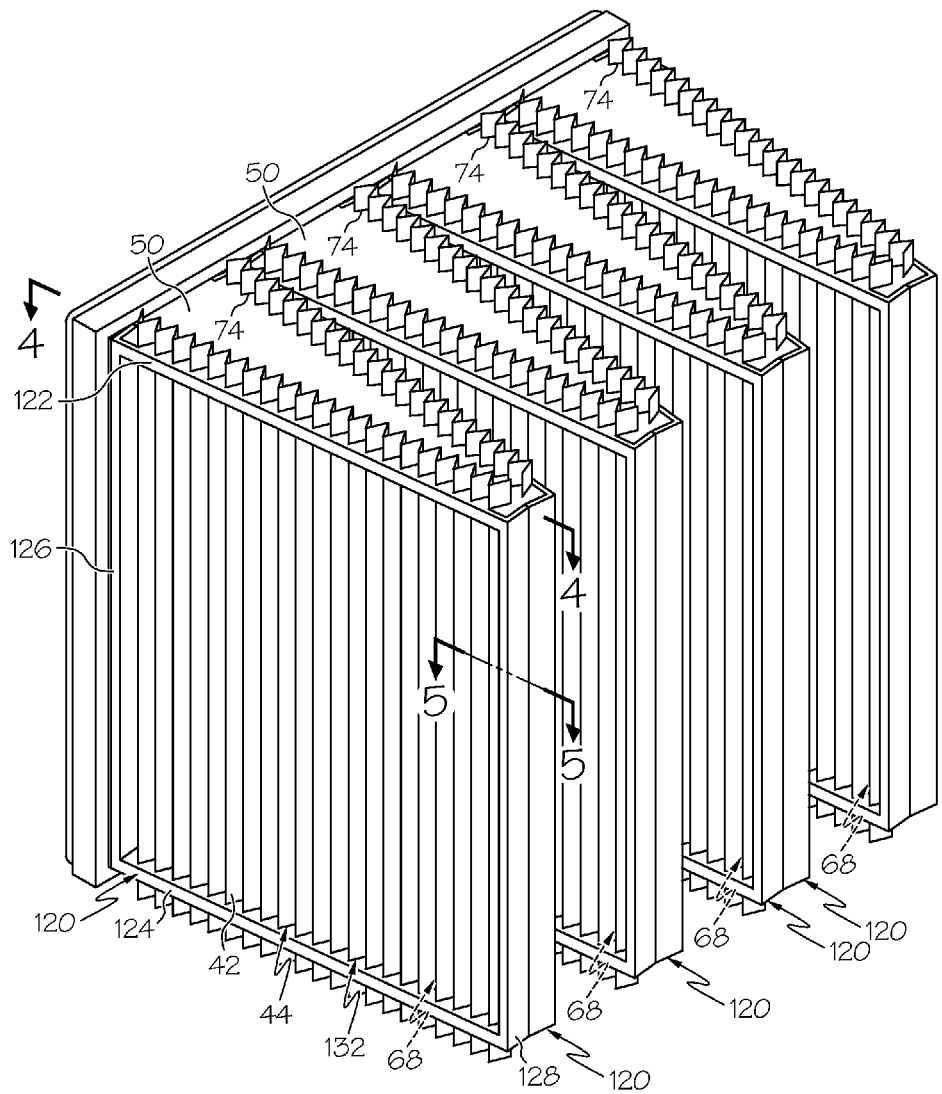
FIG. 3 is schematized, perspective illustration of the filter arrangement of FIG. 2 from a different perspective.

Turning to FIGS. 2 and 3, schematized perspective views of one example filter arrangement 12 in accordance with at least one aspect of the present invention are shown. The filter arrangement 12 includes a frame 40 and a plurality of filter pleat packs 42 that are each removably located within a respective filter pleat pack location 44 (see also FIG. 4) on the frame 40 in accordance with an aspect of the present invention.

Turning to the frame 40, the frame may be made of any generally rigid material such as plastic or metal. It is to be appreciated that the frame 40 has an outer periphery that has a shape and size that is complementary to a shape and size of the aperture 26 to block bypass flow as discussed above. The frame 40 can thus be considered to be configured such that the outer periphery of the frame 40 is to mate against a sheet or barrier as mentioned above. The frame has a top 50 and a bottom 52 that are solid such that fluid does not pass there through. The top 50 and bottom 52 extend from a front side 56 of the frame 40 to a rear side 58 of the frame. The top 50 and bottom 52 face each other to bound an interior space or at least one interior space portion. Also, the front side of the frame 40 is open to receive the flow of fluid 14A and the rear side 58 of the frame is closed.

The frame 40 is configured such that a series of apertures 68 extend through the frame. It is to be appreciated that with FIGS. 2 and 3 the pleat packs 42 extend across the apertures 68 and thus "cover" the apertures 68 when viewed from an exterior of the filter arrangement 12. As such, the arrowhead lead lines used within FIGS. 2 and 3 for the apertures 68 are presented as phantom to represent the hidden condition of the apertures.

Each aperture 68 is a passageway from an interior space of the frame 40 to the area located at/beyond the rear side of the frame. Specifically, each aperture 68 extends generally in a plane from the top 50 to the bottom 52, and generally from the front side 56 of the frame 40 to the rear side 58 of the frame. It is to be appreciated that fluid (e.g., air) can flow though the apertures 68 as the fluid proceeds from the area at the front side 56 of the frame 40, through the interior spaces of the frame, and to the area beyond the rear side 58 of the frame.

The apertures 68 can be considered to be grouped into pairs, with each pair of apertures 68 being adjacent to a repetitive interior space portion of the frame 40. For each pair of apertures 68, the two apertures can oriented relative to each other to form a V-shape, with an open/large end of the V-shape being directed at the front side 56 of the frame 40 and the small/closed end of the V-shape being at the rear side 58 of the frame. Of course, the pair of apertures 68 need not be in a V-shape. For example, for each pair of apertures 68, the apertures may be located in two generally parallel, but offset planes.

Within the shown example, there are multiple (e.g., four) V-shaped pairs of apertures 68 in the frame 40. There can be any number of V-shaped pairs of apertures. Each V-shaped pair of apertures 68 can adjoin at least one other V-shaped pair. However, it is to be appreciated that if desired, only a single V-shaped pair of apertures 68 could be provided.

At each aperture though the frame 40, the frame has a contoured surface 74 (see FIGS. 2-4) extending along an edge at the top 50 of the frame and a contoured surface 76 (see FIG. 2) extending along an edge at the bottom 52 of the frame. Within the shown example, these contoured surfaces 74, 76 have a saw-tooth contour configuration. Thus, each saw-tooth contoured surface 74 at the top 50 and each saw-tooth contoured surface 76 the bottom 52 (e.g., see the contour surface example at the top 50 of the frame 40 shown with FIG. 4) has a series of teeth 80 that are defined by a series of peaks 82 and valleys 84 that alternate along the extent of the saw-tooth contour. It is to be appreciated that within the presented example, the contoured surface 74 at the top 50 of the frame 40 is vertically aligned with the contoured surface 74 at the bottom 52 of the frame. See FIGS. 2 and 3 for ease of reference concerning the vertical alignment. Thus, as the contoured surfaces 74 at the top 50 and bottom 52 progress from the front side 56 toward the rear side 58, both the contoured surfaces 74 at each respective aperture 68 simultaneously and contemporaneously proceed though a similar tooth (i.e., peak 82 and valley 84) sequence. It is contemplated that at each of the apertures 68, the frame 40 has a similar edge surface contour configuration. It is to be appreciated that the example contoured surfaces 74 is just one example and that different profiles (e.g., different tooth spacing, tooth pitch, tooth depth, etc.) are possible and contemplated. Also, it is contemplated that different edge surface contour configurations (e.g., rounded tooth) may be present on the frame.

Also at each aperture though the frame 40, the frame has side edge surfaces 90 (see FIG. 5, with reference to FIG. 3 to see section location) that extend between the top 50 and bottom 52 of the frame 40 (i.e., vertically as viewed with FIGS. 2 and 3) adjacent to the front side 56 and rear side 58 of the frame. These side edge surfaces 90 may have a profile, such as a V-shaped profile that extends along the extent of the respective surface between the top 50 and the bottom 52 of the frame 40. It is to be appreciated that the example shown within FIG. 5 is just one example and that different profiles (e.g., rounded) of the side edge surfaces 90 are possible and contemplated.

Turning to the plurality of filter pleat packs 42, each filter pleat pack is formed of a filter media for filtering particulate matter as fluid (e.g., air) flows from the dirty side to the clean side. It is to be appreciated that the filter media may have any of several known materials such as, fibers (e.g., glass fibers), membrane (e.g., ePTFE), a combination of multiple materials/components, etc. It is to be appreciated that the specific filter media need not be a limitation upon the present invention. In general, the specific filter media may be selected/chosen for specific filtration needs (e.g., specific particulate matter to be filtered).

Each filter pleat pack 42 is pleated such that the surface area through which fluid (e.g., air) can flow for filtering extends along each of the plurality of pleats 100 of the filter media. It is to be appreciated that the pleats 100 can have any size, configuration, orientation, etc. It is to be appreciated that the size, configuration, orientation, etc. of the pleats 100 are to generally match the contoured surfaces 74 extending along the edges at the top 50 and bottom 52 of the frame 40. In other words, the profile of the pleats 100 is complementary to the contoured surfaces 74 extending along the edges at the top 50 and bottom 52 of the frame 40. See FIG. 4. Within the shown example, with the contoured surfaces 74 having a saw-tooth contour configuration, the profile of the pleats 100 also has a saw-tooth configuration. Thus, the pleats 100 have a series of peaks 102 and valleys 104 that alternate similar to the alternation of the peaks 82 and valleys 84 along the extent of the saw-tooth contoured surfaces 74 on the frame 40. Accordingly, the pleats 100 of the pleat pack 42 mate into the contoured surfaces 74 at the top and bottom edges of the frame 40 adjacent to the respective apertures 68.

Figures 4, 5:
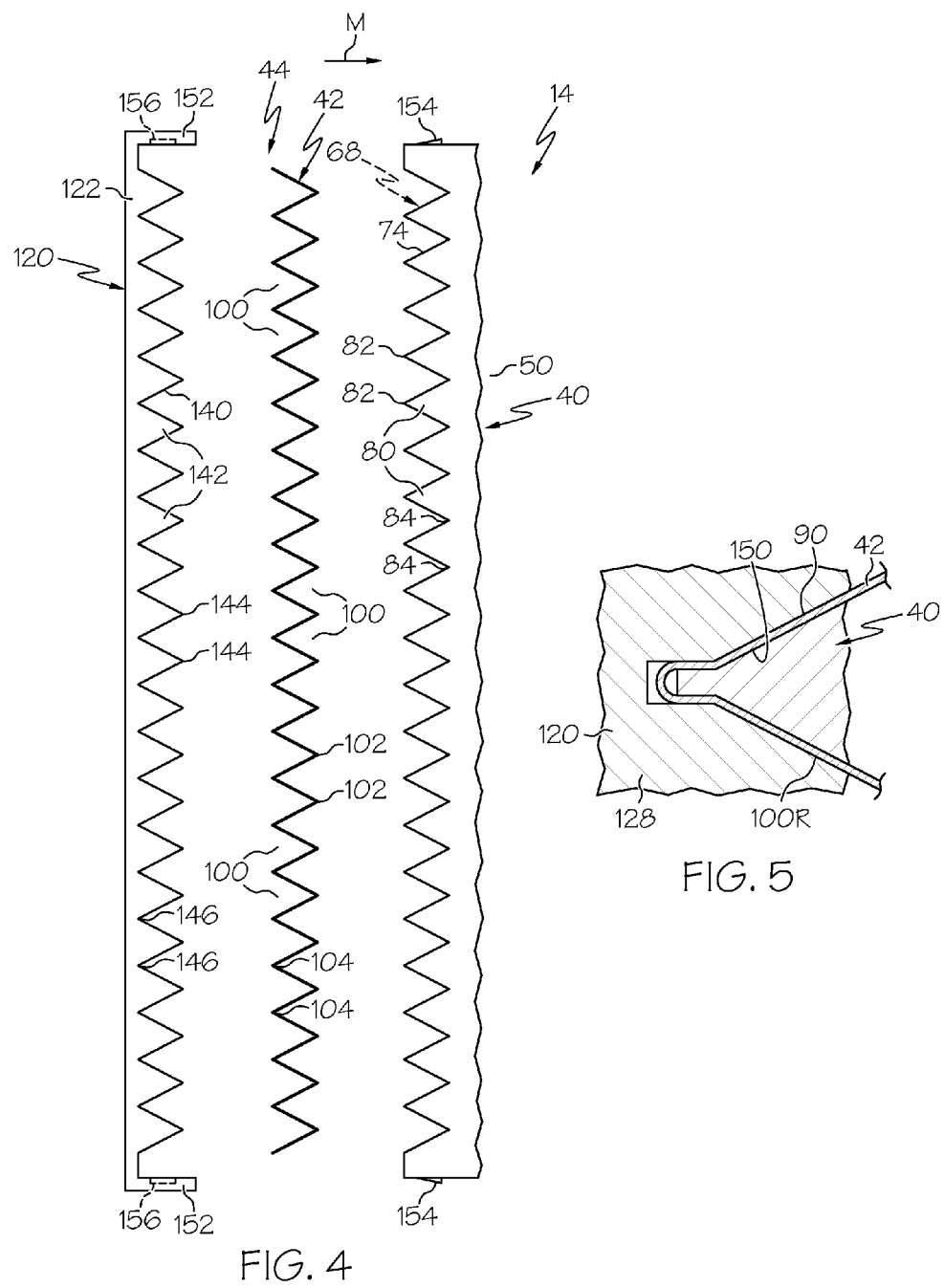
FIG. 4 is a view taken along line 4-4 in FIG. 3 showing a portion of a frame, a portion of a pleat pack and a portion of a retainer clip of the filter arrangement.
FIG. 5 is an enlarged view taken along line 5-5 in FIG. 3 showing another portion of the frame, another portion of the pleat pack and another portion of the retainer clip of the filter arrangement, with one end of the line 5-5 being hidden within the view of FIG. 3.

Also, adjacent to the front side 56 and the rear side 58 of the frame 40, each pleat pack 42 includes respective pleats that are referred to herein as front and rear pleats (see FIG. 4 for an example rear pleat 100R). It is to be appreciated that the size, configuration, orientation, etc. of the front and rear pleats are generally matched the contoured surfaces (e.g., see surface 90 adjacent to the rear side 58, see FIG. 5) extending along the edges at the front and rear of the respective aperture 68 in the frame 40. Specifically, the profiles of the front and rear pleats are complementary to the contoured surfaces 90 extending along the front and rear edges at the aperture 68. Focusing upon the example shown within FIG. 5, the contoured surface 90 has a single tooth profile configuration. Accordingly, the respective rear pleat 100R of the pleat pack 42 mates onto the single tooth profile configuration.

It is to be understood that each of pleat packs 42 is removably mate-able into the contoured surfaces 74 at the top and bottom edges of the frame 40 adjacent to the respective aperture 68. Also, the front and rear pleats of the pleat pack 42 are removably mate-able into the contoured surfaces (e.g., 90) at the front and rear edges of the respective aperture 44 of the frame 40. As can be appreciated upon reviewing FIG. 4, the mating movement M (see arrowhead M) of each pleat pack 42 relative to the contoured surfaces (e.g., 74 and 90) is via a movement in a direction generally transverse to the plane of the aperture 68. In FIG. 4, the mating movement M of the pleat pack to the frame is in a direction toward the right. Conversely, removal (e.g., de-mating) movement of the pleat pack from the frame would in a direction toward the left as viewed in FIG. 4.

It is to be appreciated that in view of the complementary contour of each pleat pack 42 relative to the contoured surfaces (e.g., 74 and 90) of the fame 40, the pleat pack can and does seat directly against the frame 40. Accordingly, with such direct seating, fluid (e.g., air) may not bypass the filter media via a path around an end of the pleat pack 42.

The example filter arrangement 12 also includes a plurality of retainer clips 120 (see FIGS. 2 and 3, in which an example retainer clip is schematically shown). Each retainer clip 120 has an overall shape that is generally complementary to the shape of one respective aperture 68 in the frame 40. Specifically, each retainer clip 120 has upper and lower segments 122, 124 that extend in a front to rear direction and are somewhat longer than a front to rear length of the respective aperture 68 in the frame 40. Also, each retainer clip 120 has front and rear segments 126, 128 that extend in a vertical direction and are somewhat longer than a vertical length of the respective aperture 68 in the frame 40. Thus, the retainer clip 120 itself has an opening 132 that is generally the same size as the respective aperture 68 in the frame.

For each retainer clip 120, the upper and lower segments 122, 124 each respectively has a contoured surface 140 extending thereon (e.g., see the contour surface example of the upper segment 122 shown with FIG. 4) that is complementary to the pleats 100 of the pleat pack 42 and thus the respective contoured surface 74 on the frame 40. These contoured surfaces 140 thus have a saw-tooth contour configuration. Accordingly, each saw-tooth contour (e.g., see the contour surface example of the upper segment shown with FIG. 4) has a series of teeth 142 that are defined by a series of peaks 144 and valleys 146 that alternate along the extent of the saw-tooth contour. It is to be appreciated that within the presented example, the contour at the upper segment 122 is vertically aligned with the contour at the lower segment 124 of the retainer clip 120. Thus, as the top and bottom segments progress from the front side toward the rear side, the contoured surfaces 140 at both the upper and lower segments 122, 124 simultaneously and contemporaneously proceed though a similar tooth (i.e., peak and valley) sequence.

As mentioned, the saw-tooth contoured surfaces 140 on the top and bottom segments 122, 124 of the retainer clip 120 are the complementary to the saw-tooth contoured surfaces 74 of the frame 40 adjacent to the respective frame aperture 68. In this respect, each saw-tooth contour of the retainer clip 120 can be considered to be a mate or mirror image of the respective saw-tooth contour of the frame 40. Each saw-tooth contour of the retainer clip 120 has a valley 146 for each peak 82 of the saw-tooth contoured surface 74 of the frame 40 and vice-versa.

Also at each retainer clip 120, the front and rear segments 126, 128 have a profile, such as an inverted or recessed V-shaped profiled surface 150 (FIG. 5) that extends along the extent of the respective segment between the top and the bottom segments 122, 124 of the retainer clip. See FIG. 5 for an example inverted or recessed V-shaped profiled surface 152 of the front and rear segments. It is to be contemplated that the shape may be varied. The inverted or recessed V-shaped profiled surfaces 152 of the front and rear segments 126, 128 of the retainer clip 120 are the complementary to V-shaped profiles of the front and rear surfaces 90 of the frame. In this respect, the inverted or recessed V-shaped profiled surfaces 152 of the retainer clip 120 can be considered to be the mates or mirror images of the V-shaped profiled surfaces 90 of the frame 40.

Turning to review the overall arrangement 12, it is contemplated that at each of retainer clips 120 can be similar/identical. Each retainer clip 120 being complementary to the frame 40 at the respective frame aperture 68. It is contemplated that different edge contour configurations may be present.

Each retainer clip 120 is to be positioned adjacent to a respective pleat pack 42, with the pleat pack adjacent to the frame 40 (see FIGS. 4 and 5). The saw-tooth configurations of the upper and lower segments 122, 124 of the retainer clip 120 and the profiles of the front and rear segments 126, 128 of the retainer clip 120 are complementary to the pleats 100 of the pleat pack 42. Accordingly and similar to the surfaces of the frame 40, the segments 122-128 of the retainer clip 120 mate into the pleats 100 of the pleat pack 42. It is to be understood that segments, 122-128 of the retainer clip 120 are removably mate-able into the pleats 100 of the pleat pack 42. As can be appreciated upon reviewing FIGS. 4 and, the mating movement of the retainer clip 120 into the pleats 100 of the pleat pack 42 is via a movement M in a direction transverse to the plane of the aperture 68. In FIG. 4, the mating movement would be in a direction toward the right. Conversely, removal (e.g., de-mating) movement would be in a direction toward the left as viewed in FIG. 4.

In view of the complementary contour of each retainer clip 120 to the pleats 100 of the respective pleat pack 42, the retainer clip can and does seat directly against the pleat pack. Accordingly, with such direct seating, fluid (e.g., air) may not bypass flowing through the filter media via a path around an end of the pleat pack 42. It is to be appreciated that each retainer clip, pleat pack and frame thus form a sandwich arrangement.

Each retainer clip 120 includes at least connector 152 for removably attaching the retainer clip to the frame 40. Corresponding structure 154 on the frame 40 cooperates with the connector 152 for the attachment. As can be appreciated, the attachment of the retainer clip 120 to the frame 40 non-permanently holds the clip relative to the frame and thus non-permanently holds the pleat pack 42 within the sandwiched position between the retainer clip and the frame and thus holds the pleat pack against the frame across the aperture 68. The specifics of the connector 152 need not be specific limitations upon the present invention. As such, the construction/configuration of the connector 152, and/or the corresponding structure 154 on the frame 40, can be varied so long as the function of removable attachment is provided. It is to be appreciated that in addition to the possible variation of the construction/configuration of the connector, any number of connectors may be provided.

Within the example of FIG. 4, two connectors 152 are visible. One connector 152 is at a forward side of the retainer clip 120 and one connector 152 is at a rearward side of the retainer clip. Also, in the shown example each connector 152 is an extending arm. Each arm is at least somewhat elastically deformable and includes a recess or aperture 156. Within the shown example, the corresponding structure 154 on the frame 40 includes a respective tapered projection that is shaped and sized to fit within the recess/aperture 156 of the respective arm 152. To attach the retainer clip 120 to the frame 40, the retainer clip is pressed toward the frame. Each arm 152 engages and slightly deforms until the respective projection structure 154 aligns into the respective recess/aperture 156. Once the projection structure 154 aligns with the recess/aperture 156, the arm 152 moves back toward a non-deformed state with the projection structure in the respective recess/aperture. With the projection structure 154 in the respective recess/aperture 156, the arm 152 is retained relative to the frame 40 and thus the retainer clip 120 is retained relative to the frame. With the pleat pack 42 between the retainer clip 120 and the frame 40, the pleat pack is also retained.

In order to release each retainer clip 120 and thus release the respective pleat pack 42, the arms 152 can be elastically deformed to release the entrapped projection structure 154. The retainer clip 120 can then be removed from attachment from the frame 40. Of course, the respective pleat pack 42 is then also released from the frame 40.

If the respective pleat pack 42 is to be removed and replaced, such as when the media of the pleat pack has entrapped sufficient particulate matter and/or the pleat pack has been in place for a desired service life, a new pleat pack can be placed over the aperture 68, with the pleats inter-fitting into the contoured surfaces of the frame 40 and the contoured surfaces of the retainer clip 120. Of course, the pleat packs 42 can be replaced, but the frame 40 and retainer clips 120 are reusable. In other words, the removal/replacement of pleat packs 42 allows reuse of the frame 40 and the retainer clips 120. Only the removed pleat packs 42 need disposal. Accordingly, the amount of material that needs to be disposed is reduced. Also, it is to be appreciated, that only replacement pleat packs 42 need to be obtained, shipped, stored, and the like. Since pleat packs 42 are generally thin and lightweight, storage of the uninstalled pleat packs tends to have a smaller storage volume requirement. Still further, it is possible that cost savings can be achieved since the frame 40 and the associated retainer clips 120 need not be replaced at the same frequency as replacement of the pleat packs.

As can be appreciated, an associated method of providing the filter arrangement 12 for the system 10 within which fluid 14 is filtered is contemplated to be within the scope of the invention. One example is for the method to be associated with the system 10 that has the portion with the aperture 26 into which the filter arrangement 12 is located for filtering fluid from a dirty side and to a clean side as the fluid flows through the filter arrangement 12. The method includes providing the frame 40 that has an outer periphery that has a shape that is complementary to a shape of the system aperture 26 for location of the filter arrangement 12 therein. The frame 40 has the plurality of filter pleat pack locations 44. Each filter pleat pack location 44 is associated with a respective aperture 68 through the frame 40 for flow proceeding from the dirty side to the clean side. At each filter pleat pack location 44 adjacent to each frame aperture 68, the frame 40 includes portions having the saw-tooth contoured surface 74. The method includes providing the plurality of filter pleat packs 42 that each allows flow therethrough while stopping flow of particulate matter. Each filter pleat pack 42 includes the plurality of pleats 100. Each filter pleat pack 42 being removably located at a respective filter pleat pack location 44 of the frame 40 and covers the respective frame aperture 68. The pleats 100 of the filter pleat pack 42 mate against the respective saw-tooth contoured surfaces 74. The method also includes providing the plurality of removable retainer clips 120 that non-permanently hold the filter pleat packs 42 against the frame 40. Each retainer clip 120 has saw-tooth contoured surfaces 140 that mate against the pleats 100 of the respective filter pleat pack 42 so that the pleats of the filter pleat pack are sandwiched between the retainer clip and the frame 40.

Figure 6:
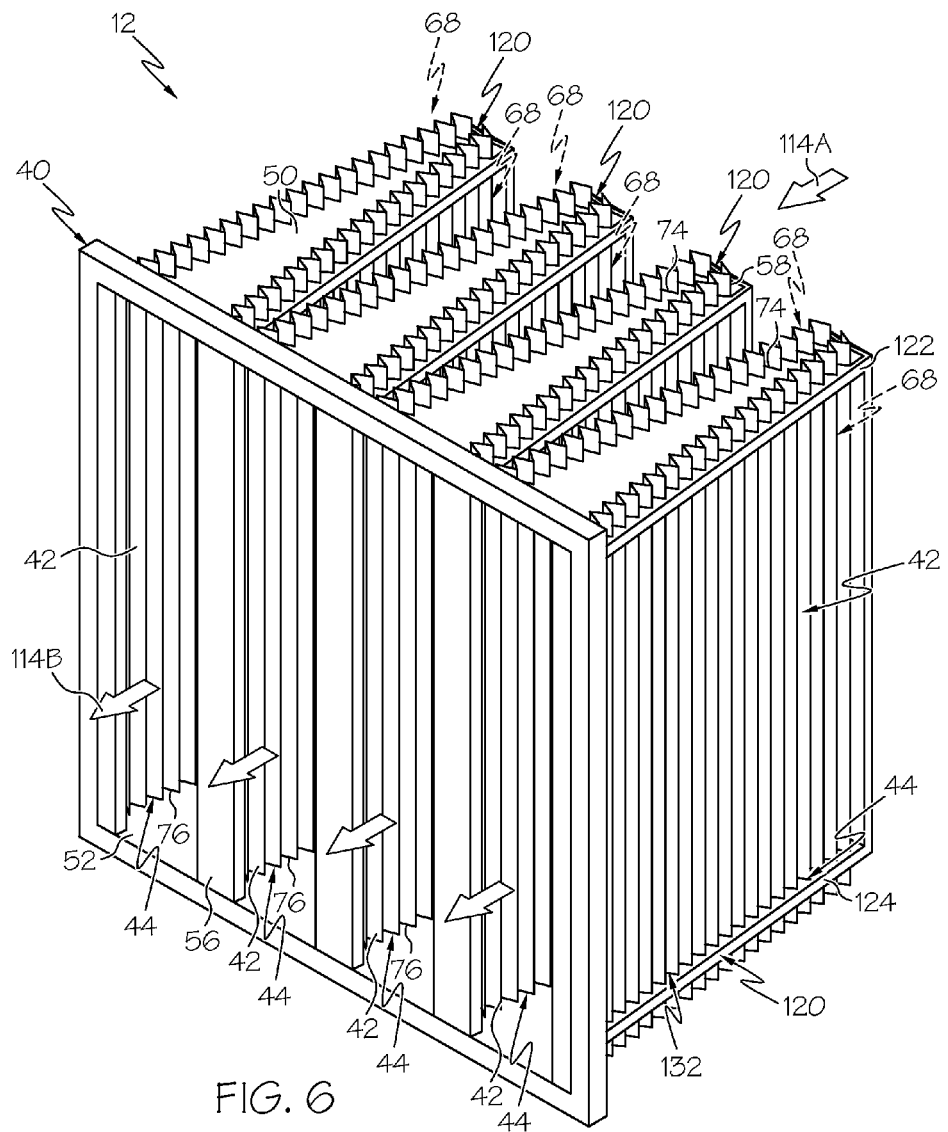
FIG. 6 is a view similar to FIG. 2, but shows that the filter arrangement can be used for a flow proceeding in a different direction.

FIG. 6 is a view similar to FIG. 2, but shows that the filter arrangement 12 can be used for a flow proceeding in a different direction. Note that fluid (e.g., ambient atmosphere air) 114A to be filtered approaches from a distal location as viewed in FIG. 6, proceeds through the filter arrangement 12, and departs from the filter arrangement as filtered fluid 114B at a proximal location as viewed in FIG. 6. Use of the filter arrangement 12 may provide for different functions, advantages or the like. For example, blocked particulate is not located within the interior of the filter arrangement 12. Of course, the flow direction of fluid through the filter arrangement 12 need not be a specific limitation upon the present invention.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A filter arrangement for a system within which fluid is filtered, the system has a portion with an aperture into which the filter arrangement is located for filtering fluid from a dirty side and to a clean side as the fluid flows through the filter arrangement, the filter arrangement including:
    a frame including:
        an outer periphery that has a shape that is complementary to a shape of the system aperture for location of the filter arrangement therein; and
        a plurality of filter pleat pack locations, each filter pleat pack location being associated with an aperture through the frame for flow proceeding from the dirty side to the clean side, at each filter pleat pack location adjacent to each frame aperture the frame includes at least one portion having a saw-tooth contoured surface;
    a plurality of filter pleat packs that each allows flow therethrough while stopping flow of particulate matter, each filter pleat pack including a plurality of pleats, each filter pleat pack being removably located at a respective filter pleat pack location of the frame, covering a respective frame aperture, with the pleats of the filter pleat pack mating against the respective saw-tooth contoured surface; and
    a plurality of removable retainers that non-permanently hold the filter pleat packs against the frame, each retainer having at least one saw-tooth contoured surface that mates against the pleats of the filter pleat pack so that the pleats of the filter pleat pack are sandwiched between the retainer and the frame.

2. A filter arrangement as set forth in claim 1, wherein each retainer includes a retainer clip.

3. A filter arrangement as set forth in claim 2, wherein each retainer clip includes segments that extend adjacent to the respective frame aperture.

4. A filter arrangement as set forth in claim 3, wherein each retainer clip includes at least connector that can removably attach the retainer clip to the frame.

5. A filter arrangement as set forth in claim 1, wherein the plurality of filter pleat packs are disposable after use and the frame is reusable.

6. A filter arrangement as set forth in claim 1, wherein the least one portion of the frame having a saw-tooth contoured surface includes a portion having a saw-tooth contoured surface located adjacent to a top of the frame and a portion having a saw-tooth contoured surface located adjacent to a bottom of the frame.

7. A filter arrangement as set forth in claim 6, wherein the least one portion of each retainer having a saw-tooth contoured surface includes a portion having a saw-tooth contoured surface located adjacent to a top of the retainer and a portion having a saw-tooth contoured surface located adjacent to a bottom of the retainer.

8. A filter arrangement as set forth in claim 1, wherein the frame includes at least one V-shaped profile side edge surface at each pleat pack location, adjacent to a respective frame aperture.

9. A filter arrangement as set forth in claim 8, wherein the pleat pack includes at least one pleat mating against the V-shaped profile side edge surface.

10. A filter arrangement as set forth in claim 9, wherein the retainer includes at least one recessed V-shaped profiled surface extending from a top to a bottom of the retainer.

11. A filter arrangement as set forth in claim 10, wherein each V-shaped profile side edge surface each recessed V-shaped profiled surface sandwich the at least one pleat mating against the V-shaped profile side edge.

12. A method of providing a filter arrangement for a system within which fluid is filtered, the system has a portion with an aperture into which the filter arrangement is located for filtering fluid from a dirty side and to a clean side as the fluid flows through the filter arrangement, the method including:

providing a frame that has an outer periphery that has a shape that is complementary to a shape of the system aperture for location of the filter arrangement therein, and that has a plurality of filter pleat pack locations, with each filter pleat pack location being associated with an aperture through the frame for flow proceeding from the dirty side to the clean side, and at each filter pleat pack location adjacent to each frame aperture the frame includes at least one portion having a saw-tooth contoured surface;

providing a plurality of filter pleat packs that each allows flow therethrough while stopping flow of particulate matter, with each filter pleat pack including a plurality of pleats, each filter pleat pack being removably located at a respective filter pleat pack location of the frame, covering a respective frame aperture, and with the pleats of the filter pleat pack mating against the respective saw-tooth contoured surface; and providing a plurality of removable retainers that non-permanently hold the filter pleat packs against the frame, each retainer having at least one saw-tooth contoured surface that mates against the pleats of the filter pleat pack so that the pleats of the filter pleat pack are sandwiched between the retainer and the frame.

13. A method as set forth in claim 12, wherein the step of providing a plurality of removable retainers includes providing each retainer with at least connector that can removably attach the retainer to the frame.

14. A method as set forth in claim 12, wherein the plurality of filter pleat packs are disposable after use and the frame is reusable.

15. A method as set forth in claim 12, wherein the step of providing a frame includes providing the frame with a saw-tooth contoured surface located adjacent to a top of the frame and a saw-tooth contoured surface located adjacent to a bottom of the frame.

16. A method as set forth in claim 12, wherein the step of providing a plurality of removable retainers includes providing each retainer with a saw-tooth contoured surface located adjacent to a top of the retainer and a saw-tooth contoured surface located adjacent to a bottom of the retainer.

* * * * *